(12) United States Patent
Yin et al.

(10) Patent No.: US 12,271,074 B2
(45) Date of Patent: *Apr. 8, 2025

(54) LIQUID CRYSTAL DISPLAY PANEL

(71) Applicant: WUHAN CHINA STAR OPTOELECTRONICS TECHNOLOGY CO., LTD., Hubei (CN)

(72) Inventors: Bingkun Yin, Hubei (CN); Changchih Huang, Hubei (CN); Guanghui Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,459

(22) Filed: Feb. 29, 2024

(65) Prior Publication Data

US 2024/0201532 A1 Jun. 20, 2024

Related U.S. Application Data

(63) Continuation of application No. 17/051,090, filed as application No. PCT/CN2020/111710 on Aug. 27, 2020.

(30) Foreign Application Priority Data

Jul. 8, 2020 (CN) .......................... 202010653148.0

(51) Int. Cl.
*G02F 1/1333* (2006.01)
*G02F 1/1335* (2006.01)
(Continued)

(52) U.S. Cl.
CPC .. *G02F 1/133357* (2021.01); *G02F 1/133512* (2013.01); *G02B 6/0036* (2013.01);
(Continued)

(58) Field of Classification Search
None
See application file for complete search history.

(56) References Cited

U.S. PATENT DOCUMENTS 8,189,259 B1 5/2012 Holm
11,947,207 B2 * 4/2024 Yin .................. G02F 1/133357

FOREIGN PATENT DOCUMENTS

CN 1605909 A 4/2005
CN 106200107 A 12/2016
(Continued)

OTHER PUBLICATIONS

Chinese Office Action issued in corresponding Chinese Patent Application No. 202010653148.0 dated Mar. 25, 2021, pp. 1-9.
(Continued)

*Primary Examiner* — Dung T Nguyen

(57) ABSTRACT

The present application discloses a liquid crystal display panel and a method of manufacturing the same. The liquid crystal display panel includes a pixel area, and further includes: a glass substrate serving as a light guide plate; a reflective layer disposed on a side of the light guide plate; a grating structure disposed on a side of the light guide plate away from the reflective layer, and corresponding to the pixel area; a planarization layer disposed on a side of the grating structure away from the light guide plate; and a thin-film transistor layer disposed on a side of the planarization layer away from the light guide plate.

11 Claims, 2 Drawing Sheets

(51) Int. Cl.
  *F21V 8/00*  (2006.01)
  *G02F 1/1368*  (2006.01)
(52) U.S. Cl.
  CPC .. *G02F 1/133302* (2021.01); *G02F 1/133624* (2021.01); *G02F 1/1368* (2013.01)

(56) References Cited

FOREIGN PATENT DOCUMENTS

| | | | |
|---|---|---|---|
| CN | 108319070 | A | 7/2018 |
| CN | 108710240 | A | 10/2018 |
| CN | 109031770 | A | 12/2018 |
| CN | 109212834 | A | 1/2019 |
| CN | 109765721 | A | 5/2019 |

OTHER PUBLICATIONS

Chinese Office Action issued in corresponding Chinese Patent Application No. 202010653148.0 dated Sep. 16, 2021, pp. 1-7.
Chinese Office Action issued in corresponding Chinese Patent Application No. 202010653148.0 dated Jan. 28, 2022, pp. 1-6.
International Search Report in International application No. PCT/CN2020/111710, mailed on Apr. 14, 2021.
Written Opinion of the International Search Authority in International application No. PCT/CN2020/111710,mailed on Apr. 14, 2021.
Chinese Rejection Decision issued in corresponding Chinese Patent Application No. 202010653148.0 dated Jun. 16, 2022, pp. 1-5.

\* cited by examiner

LIQUID CRYSTAL DISPLAY PANEL

RELATED APPLICATIONS

This application is a continuation of U.S. patent application Ser. No. 17/051,090, titled "LIQUID CRYSTAL DISPLAY PANEL AND METHOD OF MANUFACTURING THE SAME", filed Oct. 27, 2020, which is the National Stage of International Patent Application No. PCT/CN2020/111710, filed Aug. 27, 2020, which claims priority to and the benefit of Chinese Patent Application No. 202010653148.0, filed Jul. 8, 2020 the entireties of which are hereby incorporated herein by reference.

TECHNICAL FIELD

The present application relates to a field of display panels, and in particular to a liquid crystal display panel and a manufacturing method thereof.

BACKGROUND

With the development of digital technology, liquid crystal display products have been widely used in various aspects of daily life, and the requirements for thinner and lighter liquid crystal display modules have gradually increased.

In the prior art, the liquid crystal display module adopts a structure of a liquid crystal display panel and a backlight module. The traditional edge-lit backlight module is usually composed of independent optical films such as a reflective sheet, a light guide plate, a diffuser sheet, and a prism sheet, whose assembly process is complicated, and it is difficult to achieve lighter and thinner modules.

Therefore, there is a need to develop a new type of liquid crystal display panel to overcome the defects of the prior art.

SUMMARY

The present invention provides a liquid crystal display panel, including a pixel area, and further including: a glass substrate serving as a light guide plate; a reflective layer disposed on a side of the light guide plate; a grating structure disposed on a side of the light guide plate away from the reflective layer, and corresponding to the pixel area; a planarization layer disposed on a side of the grating structure away from the light guide plate; and a thin-film transistor layer disposed on a side of the planarization layer away from the light guide plate.

The present invention also provides a method of manufacturing the liquid crystal display panel of the present invention, wherein the liquid crystal display panel includes a pixel area, and the method of manufacturing the liquid crystal display panel includes the following steps: provide a glass substrate serving as a light guide plate; preparing a reflective layer on a side of the light guide plate; preparing a grating structure on a side of the light guide plate away from the reflective layer, wherein a position of the grating structure corresponds to the pixel area; preparing a planarization layer on a side of the grating structure away from the light guide plate; and preparing a thin-film transistor layer on a side of the planarization layer away from the light guide plate.

BRIEF DESCRIPTION OF THE DRAWINGS

The following detailed description of specific implementations of the present application in conjunction with the accompanying drawings will make the technical solutions and other beneficial effects of the present application obvious.

Figure 1:
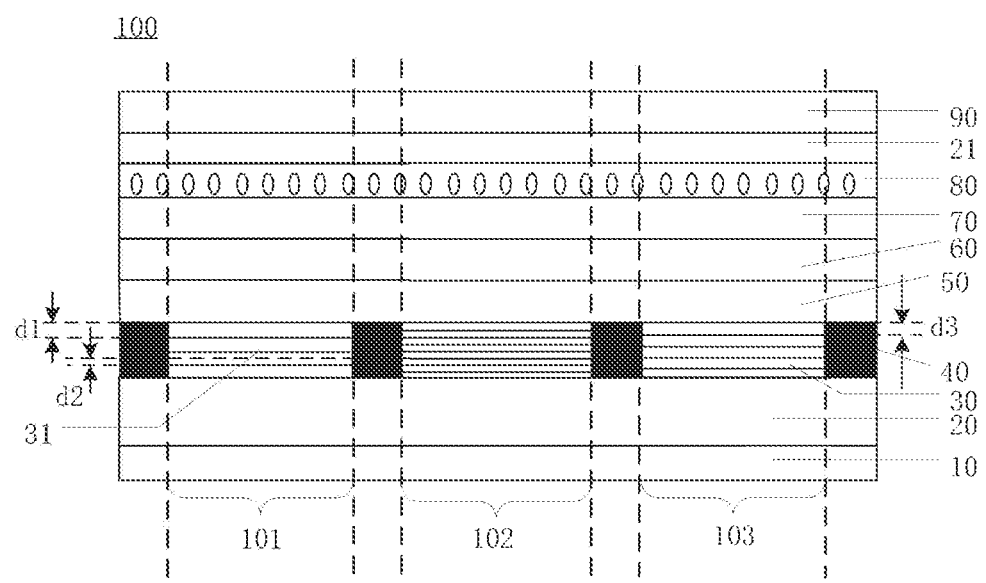
FIG. 1 is a schematic structural diagram of a liquid crystal display panel provided by an embodiment of the present invention.

Elements in the drawings are designated by reference numerals listed below.

LCD panel—100; reflective layer—10; glass substrate—20; grating structure—30; sub-grating—31; light-shielding layer—40; planarization layer—50; thin-film transistor layer—60; lower polarizer—70; liquid crystal layer—80; second glass substrate—21; upper polarizer—90; red sub-pixel—101; green sub-pixel—102; blue sub-pixel—103.

DETAILED DESCRIPTION

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for realizing different structures of the present application. To simplify the disclosure of the present application, the components and settings of specific examples are described below. Of course, they are only examples and are not intended to limit the present application. In addition, the present application may repeat reference numerals and/or reference letters in different examples. Such repetition is for the purpose of simplification and clarity, and does not indicate the relationship between the various embodiments and/or settings discussed. In addition, the present application provides examples of various specific processes and materials, but those of ordinary skill in the art may be aware of the present applications of other processes and/or the use of other materials.

An embodiment of the present invention provides a liquid crystal display panel. Referring to FIG. 1, FIG. 1 is a schematic structural diagram of a liquid crystal display panel 100 provided by this embodiment. The liquid crystal display panel 100 includes a pixel area, a reflective layer 10, a glass substrate 20, a grating structure 30, a light-shielding layer 40, a planarization layer 50, a thin-film transistor layer 60, a lower polarizer 70, a liquid crystal layer 80, a second glass substrate 21, an upper polarizer 90, and a light source (not shown).

The glass substrate 20 is used as a light guide plate, the light source is disposed on a side of the light guide plate; the reflective layer 10 is coated on a lower surface of the glass substrate 20; the grating structure 30 is disposed above the light guide plate, a position of the grating structure 30 corresponds to the pixel area; the light-shielding layer 40 is disposed between the grating structure 30; the planarization layer 50 is disposed on the grating structure 30; the thin-film transistor layer 60 is disposed on the planarization layer 50; the lower polarizer 70 is disposed on the thin-film transistor layer 60; the liquid crystal layer 80 is disposed on the lower polarizer 70; the second glass substrate 21 is disposed on the liquid crystal layer 80; and the upper polarizer 90 is disposed on a side of the second glass substrate 21 away from the liquid crystal layer 80.

The glass substrate 20 in the array substrate is configured to serve as a light guide plate, which can reduce a thickness of the liquid crystal display panel 100.

The pixel area includes a number of pixel units, each of the pixel units has a plurality of sub-pixels; the grating structure 30 has a plurality of grating units, each of the grating units has a sub-grating 31 and corresponds to one of the pixel units; and in the pixel units and the grating units corresponding to the pixel units, each of the sub-gratings 31 corresponds to one of the sub-pixels. Specifically, referring to FIG. 1, the liquid crystal display panel includes a plurality of light-shielding layers disposed on a same layer as the grating structure, and each of the light-shielding layers is disposed between adjacent two of the sub-gratings. Further, the planarization layer is disposed on and cover the grating structure and the light-shielding layers. In addition, a width of a sub-grating is equal to a width of a corresponding sub-pixel.

The sub-pixels include a red sub-pixel 101, a green sub-pixel 102, and a blue sub-pixel 103, and the sub-grating 31 in each of the sub-pixels includes a plurality of layers with a same thickness. Thicknesses and refractive indexes of the layers of the sub-gratings 31 in a red sub-pixel area 101, a green sub-pixel area 102, and a blue sub-pixel area 103 are different; and emission wavelengths of the sub-gratings 31 in the red sub-pixel area 101, the green sub-pixel area 102, and the blue sub-pixel area 103 are controlled according to the Bragg equation: $2d \sin\theta = n\lambda$, where d is a thickness of the layers of each of the sub-gratings 31, $\theta$ is an incident angle of incident light, n is a refractive index of the layers of each of the sub-gratings 31, $\lambda$ is an emission wavelength, and the emission light wavelength of each of the sub-gratings 31 is controlled by adjusting the thickness of the layers of each of the sub-gratings 31, the incident angle of the incident light, and the refractive index of the layers of each of the sub-gratings 31.

Each of the sub-gratings 31 in the red sub-pixel area 101 emits light with a wavelength of 580 nm-660 nm, each of the sub-gratings 31 in the green sub-pixel 102 area emits light with a wavelength of 500 nm-580 nm, and each of the sub-gratings 31 in the blue sub-pixel 103 area emits light with a wavelength of 440 nm-500 nm.

By forming a grating on the upper surface of the glass substrate 20, the wavelength of the emitted light of the grating is controlled by adjusting the diffraction surface spacing, incident ray angle and diffraction order, By forming a grating on an upper surface of a glass substrate, and adjusting a diffraction surface spacing, incident ray angle, and diffraction order to control a wavelength of emitted light of the grating, the gratings in red, green, and blue sub-pixel areas can transmit red, green, and blue light respectively, the gratings that can transmit red, green, and blue light can replace the existing red and green color resists, and a light-shielding layer between the gratings can replace the existing black matrix, so that the liquid crystal display panel does not need to be provided with a color filter substrate, thereby reducing an overall thickness of the liquid crystal display panel.

Figure 2:
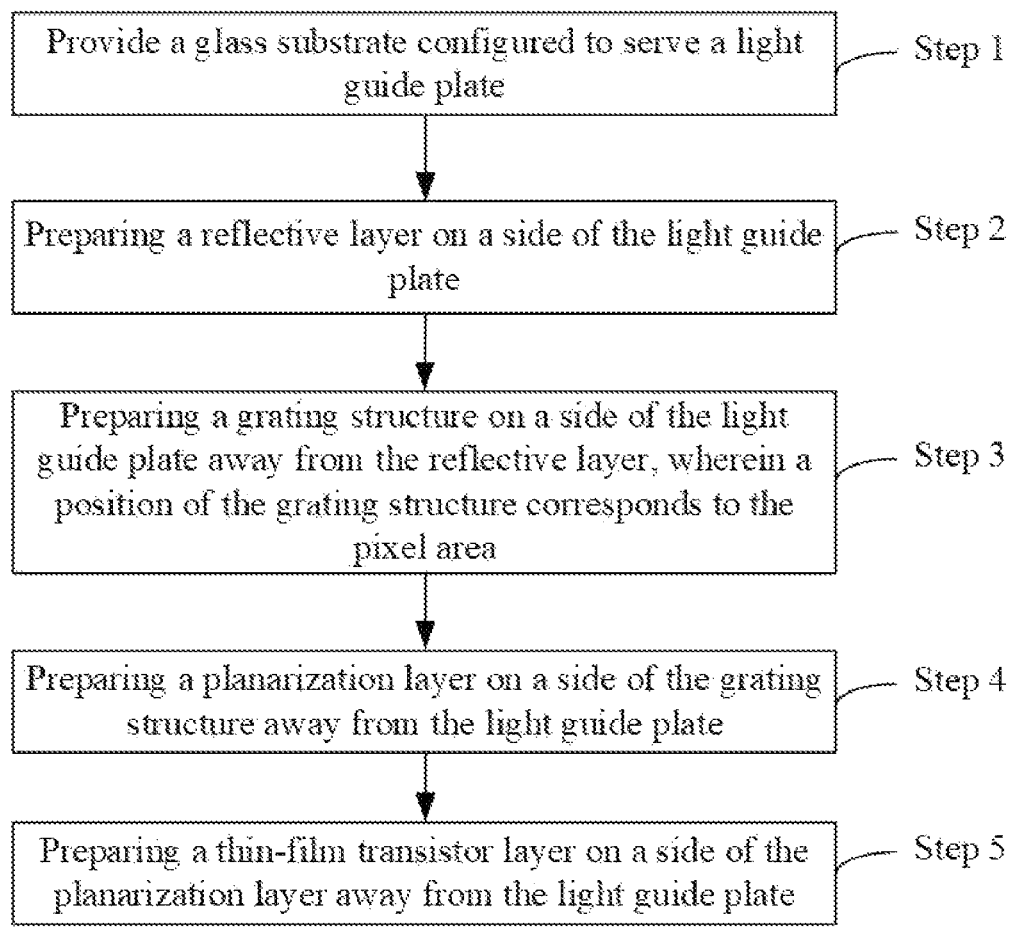
FIG. 2 is a flowchart of a method of manufacturing a liquid crystal display panel provided by an embodiment of the present invention.

An embodiment of the present invention also provides a method of manufacturing the liquid crystal display panel 100 provided by the present invention. The liquid crystal display panel 100 includes a pixel area. Referring to FIG. 2, FIG. 2 shows a flow chart of a method of manufacturing the liquid crystal display panel, including the step 1 to step 5.

Step 1: providing a glass substrate 20 configured to serve as a light guide plate;

Step 2: preparing a reflective layer 10 on a side of the light guide plate;

Step 3: preparing a grating structure 30 on a side of the light guide plate away from the reflective layer 10, wherein a position of the grating structure 30 corresponds to the pixel area;

The grating structure 30 is made of silicon oxide, the silicon oxide is doped with a photosensitive material, and the grating structure 30 is prepared by chemical vapor deposition.

The pixel area includes a plurality of pixel units, each of the pixel units has a plurality of sub-pixels; the grating structure 30 has a plurality of grating units, each of the grating units has a sub-grating and corresponds to one of the pixel units; and in the pixel units and the grating units corresponding to the pixel units, each of the sub-gratings corresponds to one of the sub-pixels.

The sub-pixels include a red sub-pixel 101, a green sub-pixel 102, and a blue sub-pixel 103, and the sub-grating 31 in each of the sub-pixels includes a plurality of layers with a same thickness; wherein thicknesses and refractive indexes of the layers of the sub-gratings in a red sub-pixel area 101, a green sub-pixel area 102, and a blue sub-pixel area 103 are different. The film thickness of the sub grating 31 corresponding to the red sub-pixel 101 is d1. The film thickness of the sub grating 31 corresponding to the green sub-pixel 102 is d2. The film thickness of the sub grating 31 corresponding to the blue sub-pixel 103 is d3. Emission wavelengths of the sub-gratings 31 in the red sub-pixel area 101, the green sub-pixel area 102, and the blue sub-pixel area 103 are controlled according to the Bragg equation: $2d \sin\theta = n\lambda$, where d is a thickness of the layers of each of the sub-gratings, $\theta$ is an incident angle of incident light, n is a refractive index of the layers of each of the sub-gratings 31, $\lambda$ is an emission wavelength, and the emission light wavelength of each of the sub-gratings 31 is controlled by adjusting the thickness of the layers of each of the sub-gratings 31, the incident angle of the incident light, and the refractive index of the layers of each of the sub-gratings 31.

The step of preparing the grating structure 30 includes: depositing a silicon oxide film doped with photosensitive material on the side of the light guide plate away from the reflective layer 10, and fabricating the sub-gratings 31 in the red sub-pixel area 101, the green sub-pixel area 102, and the blue sub-pixel area 103 through exposure, development, and etching.

Each of the sub-gratings 31 in the red sub-pixel area 101 emits light with a wavelength of 580 nm-660 nm, each of the sub-gratings 31 in the green sub-pixel area 102 emits light with a wavelength of 500 nm-580 nm, and each of the sub-gratings 31 in the blue sub-pixel area 103 emits light with a wavelength of 440 nm-500 nm.

Step 4: preparing a planarization layer 50 on a side of the grating structure 30 away from the light guide plate; and Step 5: preparing a thin-film transistor layer 60 on a side of the planarization layer 50 away from the light guide plate.

Between preparing the grating structure 30 and preparing the planarization layer 50, the method of manufacturing the liquid crystal display panel further includes preparing a light-shielding layer 40 between the sub-gratings, and the light-shielding layer 40 is made of an opaque material or a light-reflecting material.

After the step of preparing the thin-film transistor layer 60, the method of manufacturing the liquid crystal display panel further includes step 6 to step 9.

Step 6: preparing the lower polarizer 70 on a side of the thin-film transistor layer 60 away from the planarization layer 50.

Step 7: preparing the liquid crystal layer 80 on a side of the lower polarizer 70 away from the thin-film transistor layer 60.

Step 8: preparing the second glass substrate 21 on a side of the liquid crystal layer 80 away from the lower polarizer 70.

Step 9: preparing the upper polarizer 90 on a side of the second glass substrate 21 away from the liquid crystal layer 80.

Beneficial effects of the present invention are that: the present invention provides a liquid crystal display panel and a method of manufacturing the same, wherein by forming a grating on an upper surface of a glass substrate, and adjusting a thickness, an angle of light incidence, and a refractive index of sub-gratings, to allow the gratings in red, green, and blue sub-pixel areas to transmit red, green, and blue light respectively, the gratings that can transmit red, green, and blue light can replace the existing red and green color resists, and a light-shielding layer between the gratings can replace the existing black matrix, so that the liquid crystal display panel does not need to be provided with a color filter substrate, thereby reducing an overall thickness of the liquid crystal display panel.

Further, the glass substrate in the array substrate is configured to serve as a light guide plate, thus further reducing the thickness of the liquid crystal display panel.

In the above embodiments, the descriptions of each embodiment have their own emphasis. The parts that are not described in detail in an embodiment can be referred to the detailed descriptions in other embodiments above, which will not be repeated herein for brevity.

The liquid crystal display panel and the method of manufacturing the same provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A liquid crystal display panel, comprising a pixel area comprising a plurality of sub-pixels of different colors, wherein the liquid crystal display panel comprises:
    a glass substrate;
    a grating structure disposed on the glass substrate, comprising a plurality of sub-gratings corresponding one-to-one to the plurality of the sub-pixels of different colors, and each of the sub-gratings comprising a plurality of layers with a same thickness;
    a planarization layer disposed on the grating structure and covering the grating structure;
    a thin-film transistor layer disposed on the planarization layer; and
    a liquid crystal layer disposed on the thin-film transistor layer;
    wherein thicknesses and refractive indexes of ones of the plurality of the sub-gratings corresponding to ones of the plurality of the sub-pixels of different colors are different.

2. The liquid crystal display panel according to claim 1, wherein the plurality of the sub-pixels of different colors comprises a red sub-pixel, a green sub-pixel, and a blue sub-pixel, and thicknesses and refractive indexes of ones of the plurality of the sub-gratings respectively corresponding to the red sub-pixel, the green sub-pixel, and the blue sub-pixel are different.

3. The liquid crystal display panel according to claim 1, wherein the liquid crystal display panel further comprises a plurality of light-shielding layers, and each of the light-shielding layers is disposed between adjacent two of the plurality of the sub-gratings.

4. The liquid crystal display panel according to claim 3, wherein the plurality of the light-shielding layers are disposed in a same layer as the grating structure on the glass substrate.

5. The liquid crystal display panel according to claim 3, wherein a material of the plurality of the light-shielding layers is an opaque material or a light-reflecting material.

6. The liquid crystal display panel according to claim 2, wherein a wavelength of emitted light from one of the plurality of the sub-gratings corresponding to the red sub-pixel ranges from 580 nm to 660 nm, a wavelength of emitted light from one of the plurality of the sub-gratings corresponding to the green sub-pixel ranges from 500 nm to 580 nm, and a wavelength of emitted light from one of the plurality of the sub-gratings corresponding to the blue sub-pixel ranges from 440 nm to 500 nm.

7. The liquid crystal display panel according to claim 1, wherein the liquid crystal display panel further comprises a reflective layer, the reflective layer is disposed on a side of the glass substrate away from the grating structure.

8. The liquid crystal display panel according to claim 7, wherein the glass substrate is reused as a light guide plate, and a light source is disposed facing toward a sidewall of the glass substrate.

9. The liquid crystal display panel according to claim 1, wherein a material of the plurality of the sub-gratings comprises silicon oxide doped with a photosensitive material.

10. The liquid crystal display panel according to claim 1, wherein a width of one of the plurality of the sub-gratings is equal to a width of a corresponding one of the plurality of the sub-pixels.

11. The liquid crystal display panel according to claim 1, wherein the liquid crystal display panel further comprises a lower polarizer and an upper polarizer disposed on opposite sides of the liquid crystal layer, the lower polarizer is disposed on a side of the liquid crystal layer close to the thin film transistor, and the upper polarizer is disposed on a side of the liquid crystal layer away from the thin film transistor layer.

* * * * *